United States Patent [19]

Matsumoto et al.

[11] Patent Number: 5,178,046
[45] Date of Patent: Jan. 12, 1993

[54] SCREW FASTENING DEVICE

[75] Inventors: Kazuyuki Matsumoto, Ogaki; Akio Hashimoto, Gifu, both of Japan

[73] Assignee: Teijin Seiki Co., Ltd., Osaka, Japan

[21] Appl. No.: 736,601

[22] Filed: Jul. 26, 1991

[30] Foreign Application Priority Data

Aug. 9, 1990 [JP] Japan .................................. 2-211849
Jan. 31, 1991 [JP] Japan .................................. 3-10305

[51] Int. Cl.⁵ .................................................. B25B 71/00
[52] U.S. Cl. .................................. 81/57.14; 81/57.3; 173/163; 475/178
[58] Field of Search ............... 81/54, 57, 57.11, 57.14, 81/57.3; 173/163; 475/162, 178, 179

[56] References Cited

U.S. PATENT DOCUMENTS

| | | | |
|---|---|---|---|
| 3,129,611 | 4/1964 | Lee | 475/162 X |
| 4,448,098 | 5/1984 | Totsu | 81/57.11 X |
| 4,639,996 | 2/1987 | Fullmer | 81/470 X |
| 4,656,891 | 4/1987 | Durand | 475/179 |
| 4,690,010 | 9/1987 | Matsumoto et al. | 475/179 X |
| 4,751,853 | 6/1988 | Disset | 475/226 |

Primary Examiner—Douglas D. Watts
Assistant Examiner—Kenneth E. Peterson
Attorney, Agent, or Firm—Lane, Aitken & McCann

[57] ABSTRACT

A screw fastening device comprising a casing, a motor connected to the casing, a block body rotatably housed in the casing and having a pair of axially spaced plate portions, a plurality of torque transmitting pins each rotatably supported on the plate portions of the block body, the pins having eccentric cam portions, respectively, and being rotated by the motor, an externally toothed gear formed with engagement portions engaged by the eccentric cam portions of the torque transmitting pins, an internally toothed gear fixedly mounted in an inner periphery of the casing so that it can engage with the externally toothed gear, the internally toothed gear being slightly different in number of teeth from the externally toothed gear, and a rotational output shaft connected to either one of the plate portions of the block body. The externally toothed gear is given an eccentric motion and rotated by the rotations of the torque transmitting pins, and the block body is rotated by the rotation of the externally toothed gear.

10 Claims, 7 Drawing Sheets

SCREW FASTENING DEVICE

FIELD OF THE INVENTION

The present invention relates to a screw fastening device for an electric wrench, electric driver, etc.

DESCRIPTION OF THE PRIOR ART

In screw fastening devices in assembly lines for various products, such as screw fastening devices whose fastening torque is relatively large like nut runner devices in vehicle assembly lines, it is required that the devices are of small size and lightweight, have a good working efficiency and generate a sufficient fastening torque.

For example, an impact wrench (pistol type, angle type), which can be operated at high speeds of 2000 to 4000 rpm, is widely used as a screw fastening device of the above kind. The impact wrench uses compressed air as a source of power, and the compressed air is introduced into the impact wrench through an air hose provided between the impact wrench and a source of compressed air. For this reason, during nut and bolt fastening operation, the products being assembled were sometimes damaged by the air hose. In addition, since the impact wrench rotates its output shaft by generating vibration with the aid of compressed air, there are a large vibration and a large noise during the operation and air in the operation room is contaminated with air exhaust. Therefore, if the impact wrench is operated for a long period of time, there will be the problem that a disease caused by local vibration (e.g. Raynaud's disease) occurs in a user of the impact wrench.

In order to eliminate the above problem, an electric wrench, in which an electric motor is used as a source of power and the number of rotations of the motor output is reduced by a speed reduction mechanism, has been used in recent years. This electric wrench increases its speed reduction ratio by using a multiple-stage (2-stage or 3-stage) planetary reduction gear mechanism, in order to generate a predetermined fastening torque with a small-sized motor. In addition, the electric wrench is reduced in size and weight by reducing its rated torque to about $\frac{1}{3}$ of the maximum fastening torque, by the fact that, in fastening a nut, the fastening torque becomes large only at the final time of fastening.

However, since the conventional screw fastening device such as this is constructed such that its speed reduction ratio is increased by providing a multiple-stage planetary reduction gear mechanism for obtaining a predetermined fastening torque, this reduction gear mechanism becomes large and therefore the screw fastening device cannot be sufficiently reduced in size and weight. For this reason, in a case where a group of nuts on a constant pitch circle, for example, are automatically fastened at the same time, it is necessary to employ a large-sized automatic assembly device which connects a plurality of nut holding sockets and a plurality of electric wrenches together with universal joints and therefore an automation of assembly is difficult. If, on the other hand, the electric wrench is mounted on a robot in order to enlarge the flexibility of assembly line, the wrench cannot be mounted on a small-sized robot and can be mounted only on a large-sized robot whose weight is large, because the axial length of the screw fastening device is too large, and the electric wrench cannot be used widely for various purposes because of a large space for the large-sized electric wrench.

In addition, since in the planetary reduction gear mechanism of the screw fastening device the number of engaged teeth between the pinion and other gears is small, the rigidity of the screw fastening device with respect to shock and the like cannot be increased and the durability is considerably deteriorated in the use under excess load. Furthermore, since the output shaft of an electric motor as a drive source is coupled through a large inertia mass (e.g. a carrier, a ring gear, etc.) to the input shaft of the planetary reduction gear mechanism, the inertia becomes large at the time of actuation and it takes a long term to accelerate and decelerate. For this reason, a high-speed operation by shortening of fastening time cannot be accomplished.

It is therefore an object of the present invention to provide a novel screw fastening device in which the drive motor and speed reduction mechanism thereof are both made in a small size and in which a good working efficiency capable of shortening an accelerating and decelerating time is obtained and in which a large fastening torque is obtained, by accomplishing a small-sized speed reduction mechanism capable of enduring excess load.

SUMMARY OF THE INVENTION

In order to achieve the above object, there is provided a screw fastening device comprising a casing and a motor connected to the casing. A block body is rotatably housed in the casing and has a pair of axially spaced plate portions. A plurality of torque transmitting pins are each rotatably supported on the plate portions of the block body, the pins having eccentric cam portions, respectively, and being rotated by the motor. Externally toothed gear means is formed with engagement portions engaged by the eccentric cam portions of the torque transmitting pins. An internally toothed gear is fixedly mounted in an inner periphery of the casing so that it can engage with the externally toothed gear means, the internally toothed gear being slightly different in number of teeth from the externally toothed gear means. The externally toothed gear means is given an eccentric motion and rotated by the rotations of the torque transmitting pins. The block body is rotated by the rotation of the externally toothed gear means. A rotational output shaft is connected to either one of the plate portions of the block body.

In the state that the externally toothed gear means engages with the eccentric cam portions of the torque transmitting pins rotatably supported on the axially spaced plate portions of the block body and that this externally toothed gear means is held in engagement with the internally toothed gear slightly different in number of teeth from the externally toothed gear means, a power from the motor is transmitted to the externally toothed gear means through the eccentric cam portions of the torque transmitting pins. Then, the externally toothed gear means is rotated according to the difference in number of teeth between the externally toothed gear means and the internally toothed gear, while the externally toothed gear means is making an eccentric motion. As a result, the block body and the rotational output shaft are rotated. Therefore, between the externally toothed gear means and the internally toothed gear there are a large number of engaged teeth, so a small-sized speed reduction mechanism capable of enduring excess load and having a high speed reduction ratio can be achieved. Therefore, the screw fastening device according to the present invention has an excellent shock resistance and is of small size and lightweight. In addition, since the rotations of the torque transmitting pins impart an eccentric motion to the externally toothed gear means, the inertia of the speed reduction mechanism becomes small and the accelerating and decelerating time at the time of actuation of the screw fastening device is shortened.

BRIEF DESCRIPTION OF THE DRAWINGS

The features and advantages of a screw fastening device according to the present invention will be more clearly understood from the following description taken in conjunction with the accompanying drawings.

DESCRIPTION OF THE PREFERRED EMBODIMENTS

Figure 1:
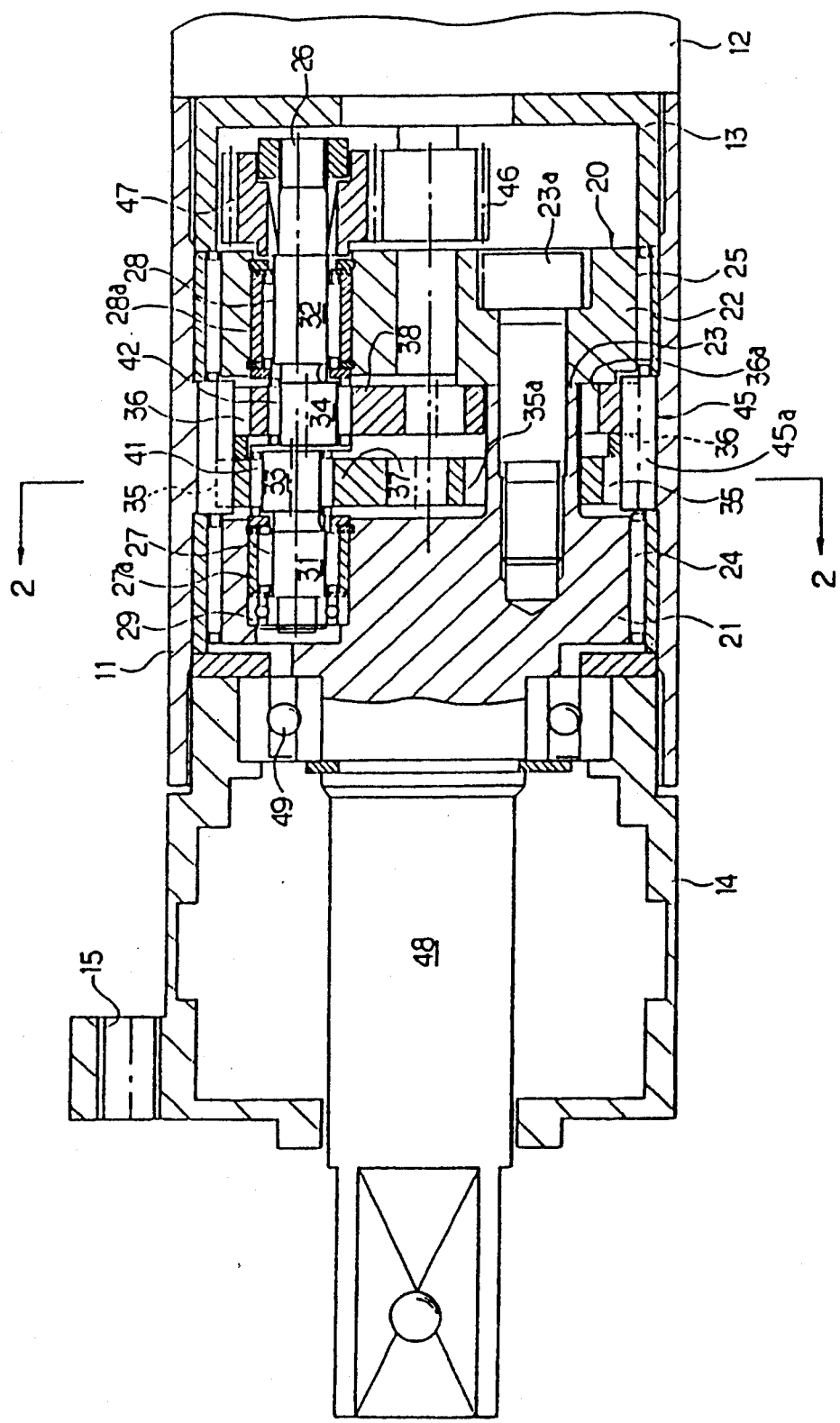
FIG. 1 is a longitudinal cross-sectional view showing one embodiment of the screw fastening device according to the present invention.
Figure 2:
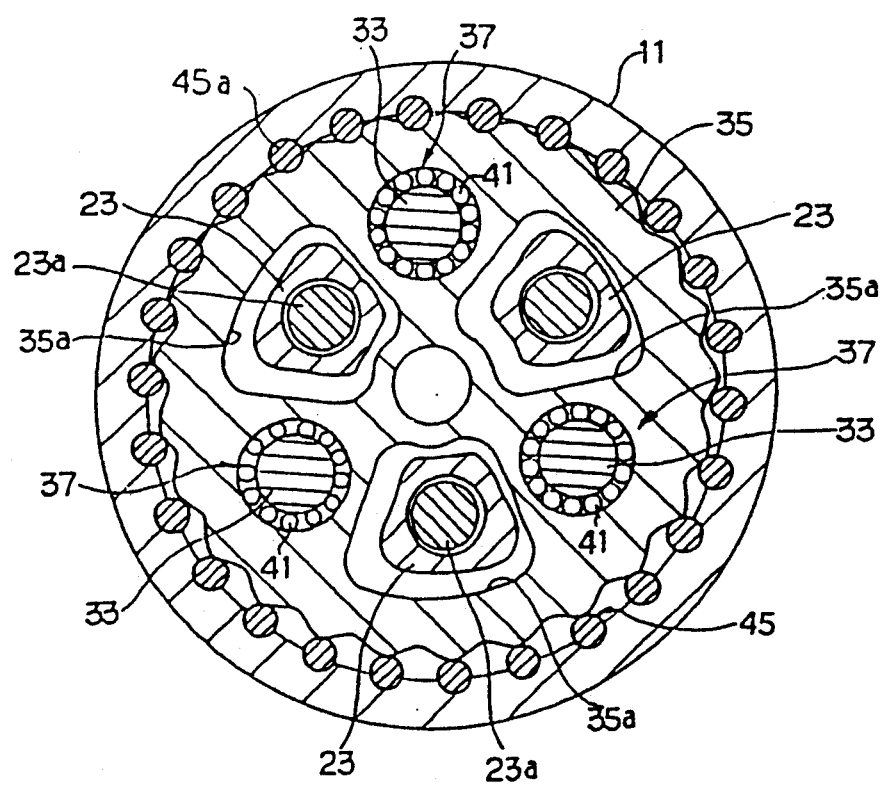
FIG. 2 is a cross-sectional view taken on line 2—2 of FIG. 1.

FIGS. 1 and 2 illustrate a preferred embodiment of a screw fastening device in accordance with the present invention. In FIGS. 1 and 2, reference numeral 11 denotes a cylindrical main body casing, and reference numeral 12 denotes an electric motor, which is fixed to a mounting plate 13 screwed into the axially outer end (the right side of FIG. 1) of the casing 11 and is connected coaxially to the casing 11. The main body casing 11, for example, is sized to the extent that it can be held by a hand, and has its axially inner end (the left side of FIG. 1) into which a support casing 14 is screwed. In the support casing 14 there are provided a rotational position detector, a speed detector, etc. The support casing 14, for example, is fixed to a robot arm (not shown) through a bolt bore 15. Within the main body casing 11 there is provided a block body 20, which has a pair of axially spaced plate portions 21 and 22 and a plurality of support portions 23 extending between the plate portions 21 and 22. These plate and support portions are assembled as a unit member by means of bolts 23a. The block body 20 is freely rotatably supported at the outer peripheries of the plate portions 21 and 22 on the main body casing 11 through needle roller bearings 24 and 25. The roller bearings 24 and 25 are provided with outer rings, respectively, each of which has a function of regulating axial movements of a plurality of the teeth (pins) 45a of an internally toothed gear 45 to be described later.

A plurality of, for example, three torque transmitting pins 26 are respectively supported at their opposite ends on the block body 20 through bearings 27 and 28. A deep groove ball bearing 29 is interposed between the left end of the torque transmitting pin 26 and the plate portion 21 so that the ball bearing 29 undergoes thrust load only. Each torque transmitting pin 26 has axial portions 31 and 32 at the opposite ends thereof and also has eccentric cam portions 33 and 34 which are inverted in phase with each other. As clearly shown in FIG. 2, an externally toothed gear 35 having a predetermined number of teeth is freely rotatably supported at its engagement portions 37 on the eccentric cam portions 33 of the torque transmitting pins 26 through bearings 41. Likewise, an externally toothed gear 36 having a predetermined number of teeth is freely rotatably supported at its engagement portions 38 on the eccentric cam portions 34 of the torque transmitting pins 26 through bearings 42. As a result, each of the externally toothed gears 35 and 36 is given an eccentric motion and rotated by rotations of the torque transmitting pins 26. In addition, as shown in FIG. 2, the externally toothed gear 36 is formed with a plurality of cutout portions 35a into which the support portions 23 of the block body 20 are loosely inserted. Likewise, the externally toothed gear 36 is formed with a plurality of cutout portions 36a into which the support portions 23 of the block body 20 are loosely inserted. The above described internally toothed gear 45 is mounted in the inner periphery of the main body casing 11 so that the gear 45 can engage with the externally toothed gears 35 and 36. The internally toothed gear 45 is constituted by a plurality of teeth (pins) 45a which are slightly more than those of each of the externally toothed gears 35 and 36. The number of teeth of the internally toothed gear 45, for example, is more than that of the externally toothed gear 35 or 36 by one.

The above described electric motor 12 has its output shaft (not shown) on which a drive gear 46 is fixedly mounted. The drive gear 46 is engaged by the driven gears 47 respectively mounted on the rear ends of the torque transmitting pins 26. By these driven gears 47, a power from the electric motor 12 is transmitted to the externally toothed gears 35 and 36 through the torque transmitting pins 26. Therefore, these torque transmitting pins 26 function as eccentric input shafts, which impart eccentric motions to the externally toothed gears 35 and 36, respectively. When the externally toothed gears 35 and 36 make eccentric motions while they are engaging with the internally toothed gear 45, the externally toothed gears 35 and 36 are rotated about their own axis according to a difference in number of teeth between the internally toothed gear 45 and the externally toothed gear 35 or 36, and the block body 20 is rotated about its own axis. Either one of the plate portions 21 and 22 of the block body 20 is connected with a rotational output shaft 48. In this embodiment, the plate portion 21 is connected with the rotational output shaft 48 so that it can rotate together with the plate portion 21. Therefore, if the block body 20 is rotated, the rotational output shaft 48 will rotate. On the end of this rotational output shaft 48 protruding from the casing 11 is detachably mounted a socket for holding a nut or bolt. Note that actuation of the electric motor 12 is performed by turning on an actuation switch (not shown) mounted on the main body casing 11. In addition, in FIG. 1, reference numeral 49 is a bearing which rotatably supports a connection part between the plate portion 21 and the rotational output shaft 48 and undergoes only thrust load from the block body 20 and rotational output shaft 48, and reference numerals 27a and 28a denote outer rings of the bearings 27 and 28 inserted into and axially fixed to the plate portions 21 and 22 of the block body 20.

The operation of the embodiment of FIG. 1 will hereinafter be described in detail.

If the electric motor 12 is actuated, rotation of this motor will be transmitted through the gears 46 and 47 to the torque transmitting shafts 26, which functions as eccentric input shafts. As the torque transmitting shafts 26 are rotated, the externally toothed gears 35 and 36 make eccentric motions, respectively, and are rotated about their own axis according to the difference in number of teeth between the internally toothed gear 45 and the externally toothed gear 35 or 36. The rotations of the externally toothed gears 35 and 36 cause the block body 20 and the rotational output shaft 48 to rotate. A nut or bolt is then fastened by the socket mounted on the rotational output shaft 48. At this time, the needle roller bearings 24 and 25, which are held in line contact with the block body 20, undergo the radial load exerted on the block body 20 through the externally toothed gears 35 and 36.

When a nut or bolt is fastened, the externally toothed gears 35 and 36 and the internally toothed gear 45 can endure excess load because, between the externally toothed gears 35 and 36 and the internally toothed gear 45, there are a large number of teeth that are in engaged state. In addition, a small-sized speed reduction mechanism can be achieved by suitably setting the number of teeth of the externally toothed gears 35 and 36 and the internally toothed gear 45. Therefore, a screw fastening device, which is of small size and lightweight and has an excellent shock resistance, can be achieved in accordance with the present invention. For instance, even in a case where a group of nuts on a constant pitch circle are fastened at the same, a small-sized automatic assembly device can be made by arranging a plurality of the small-sized screw fastening device on that pitch circle. As a consequence, the automation of assembly can be made easily In addition, since the screw fastening device of the present invention is shortened in axial length, the flexibility of assembly line can be enlarged by mounting the screw fastening device on a small-sized robot. Also, since it is easy to insert the screw fastening device into a product, a robot with that screw fastening device can be widely used for various purposes.

In addition, since the externally toothed gears 35 and 36 and the internally toothed gear 45 are held in all-teeth engagement with each other, tooth surface pressure with respect to load becomes smaller. Therefore, in a case where the rated life of the speed reduction mechanism part is the same as that of the conventional mechanism, the speed reduction mechanism part and accordingly the screw fastening device itself can be greatly reduced in size. To put it concretely, the rated life torque can be reduced to about 1/5 of maximum fastening torque, so that a space for the screw fastening device can be made less than half of the prior art.

At the time of actuation of the electric motor 12, the gears 46 rotate and also the torque transmitting pins 26 functioning as eccentric input shafts are rotated. By the rotations of the pins 26, the externally toothed gears 35 and 36 are given eccentric motions. At this time, unlike the conventional screw fastening device, it is not necessary to connect a large inertia mass, such as a carrier and a ring, with the input shaft of the speed reduction mechanism, and a distance from the center axes of rotation of the respective rotating bodies to the center of mass of the speed reduction mechanism is small Therefore, the inertia of the speed reduction mechanism according to the present invention becomes small and the accelerating and decelerating time at the time of actuation of the screw fastening device is shortened. The workhours are shortened and the operation is thus performed at high speeds.

Furthermore, since in the embodiment of FIG. 1 the needle roller bearings 24 and 25, which are thin and held in line contact with the plate portions 21 and 22 of the block body 20, are provided between the outer peripheries of the plate portions 21 and 22 and the main body casing 11, the outer diameter of the casing 11 (e.g. the outer diameter of the screw fastening device itself) can be made smaller.

Figure 3:
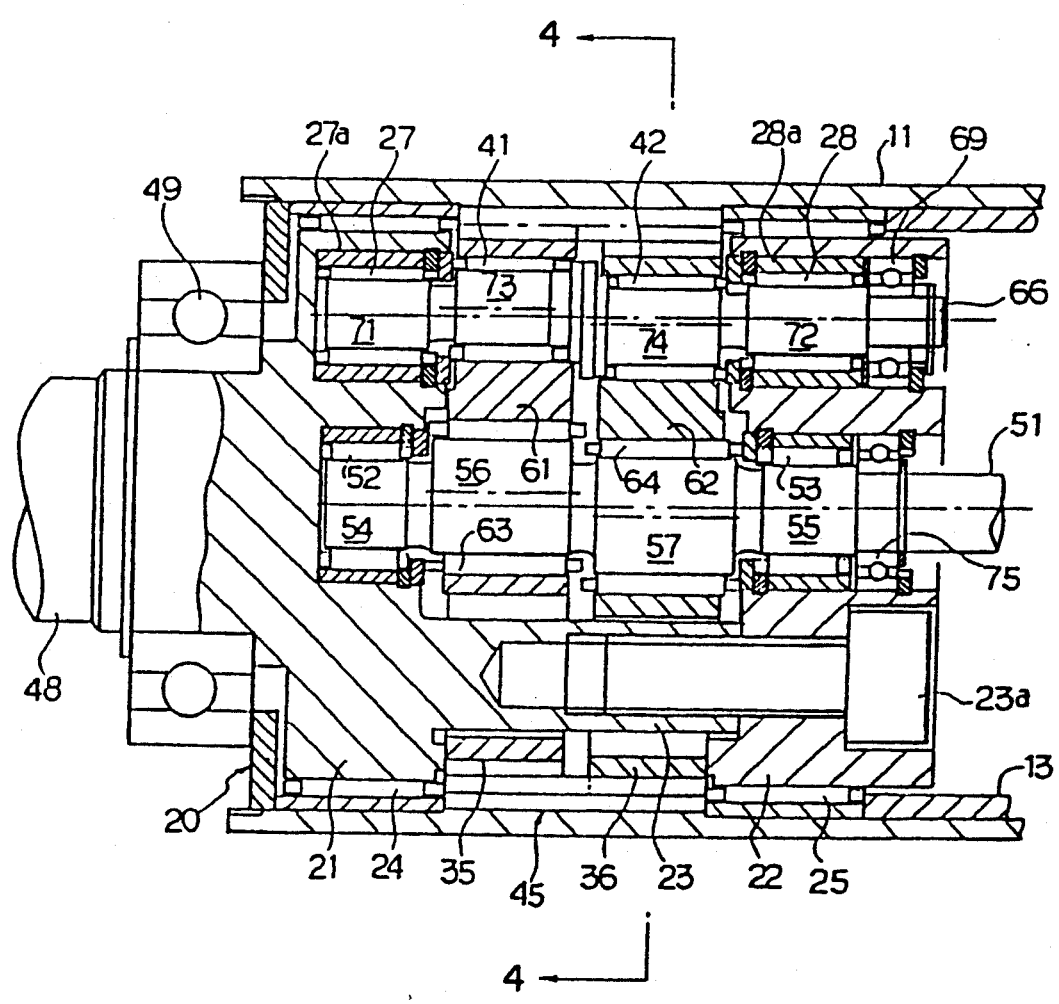
FIG. 3 is a longitudinal cross-sectional view showing another embodiment of the screw fastening device according to the present invention.
Figure 4:
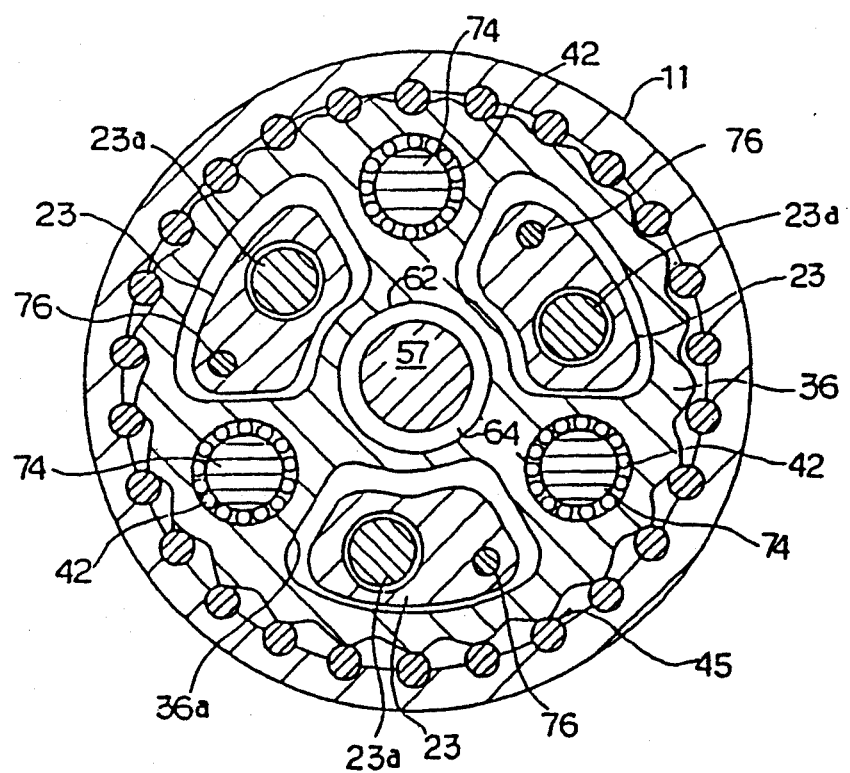
FIG. 4 is a cross-sectional view taken on line 4—4 of FIG. 3.

FIGS. 3 and 4 illustrate another embodiment of the screw fastening device according to the present invention. Many of the parts of the embodiment of FIGS. 3 and 4 are identical to corresponding parts of the embodiment of FIGS. 1 and 2 and the same reference characters will be applied to the corresponding parts.

In FIGS. 3 and 4, in the central portion of a block body 20, a center crankshaft 51 as an eccentric input shaft is rotatably supported through crankshaft bearings 52 and 53 and connected at its rear end to the output shaft (not shown) of an electric motor 12. This center crankshaft 51 has axial portions 54 and 55 at the opposite ends thereof and also has eccentric cam portions 56 and 57 which are inverted in phase with each other. An externally toothed gear 35 is freely rotatably supported at its central cutout portion 61 on the eccentric cam portion 56 of the center crankshaft 51 through a bearing 63. Likewise, an externally toothed gear 36 is freely rotatably supported at its central cutout portion 62 on the eccentric cam portion 57 of the center crankshaft 51 through a bearing 64. If a power from the electric motor 12 is transmitted to the externally toothed gears 35 and 36 through the center crankshaft 51, the externally toothed gears 35 and 36 will make eccentric motions, respectively, and rotate according to a difference in number of teeth between the externally toothed gear 35 or 36 and an internally toothed gear 45. The rotations of the externally toothed gears 35 and 36 are transmitted to torque transmitting shafts 66, which cause a block body 20 to rotate. Like the embodiment of FIGS. 1 and 2, a rotational output shaft 48 connected to the block body 20 is rotated by the rotation of the block body 20. Each torque transmitting shaft 66 has a pair of axial portions 71 and 72 which are rotatably supported on the block body 20 through bearings 27 and 28, and also has eccentric cam portions 73 and 74 which engage with the externally toothed gears 35 and 36. A deep groove ball bearing 69 is provided between the rear end of the torque transmitting shaft 66 and a rear plate portion 22 of the block body 20 so that the ball bearing 69 undergoes thrust load only. Likewise, a deep groove ball bearing 75 is provided between the center crankshaft 51 and the rear plate portion 22 of the block body 20 so that the ball bearing 75 undergoes thrust load only. As shown in FIG. 4, a plurality of positioning pins 76 are inserted into the bores formed in the rear plate portion 22 and support portions 23 of the block body 20.

In the embodiment of FIGS. 3 and 4, in addition to the same effect as that of the embodiment of FIGS. 1 and 2, the axial length of the screw fastening device can be further shortened, because the input gears 46 and 47 of FIG. 1 are replaced by the center crankshaft 51.

Figure 5:
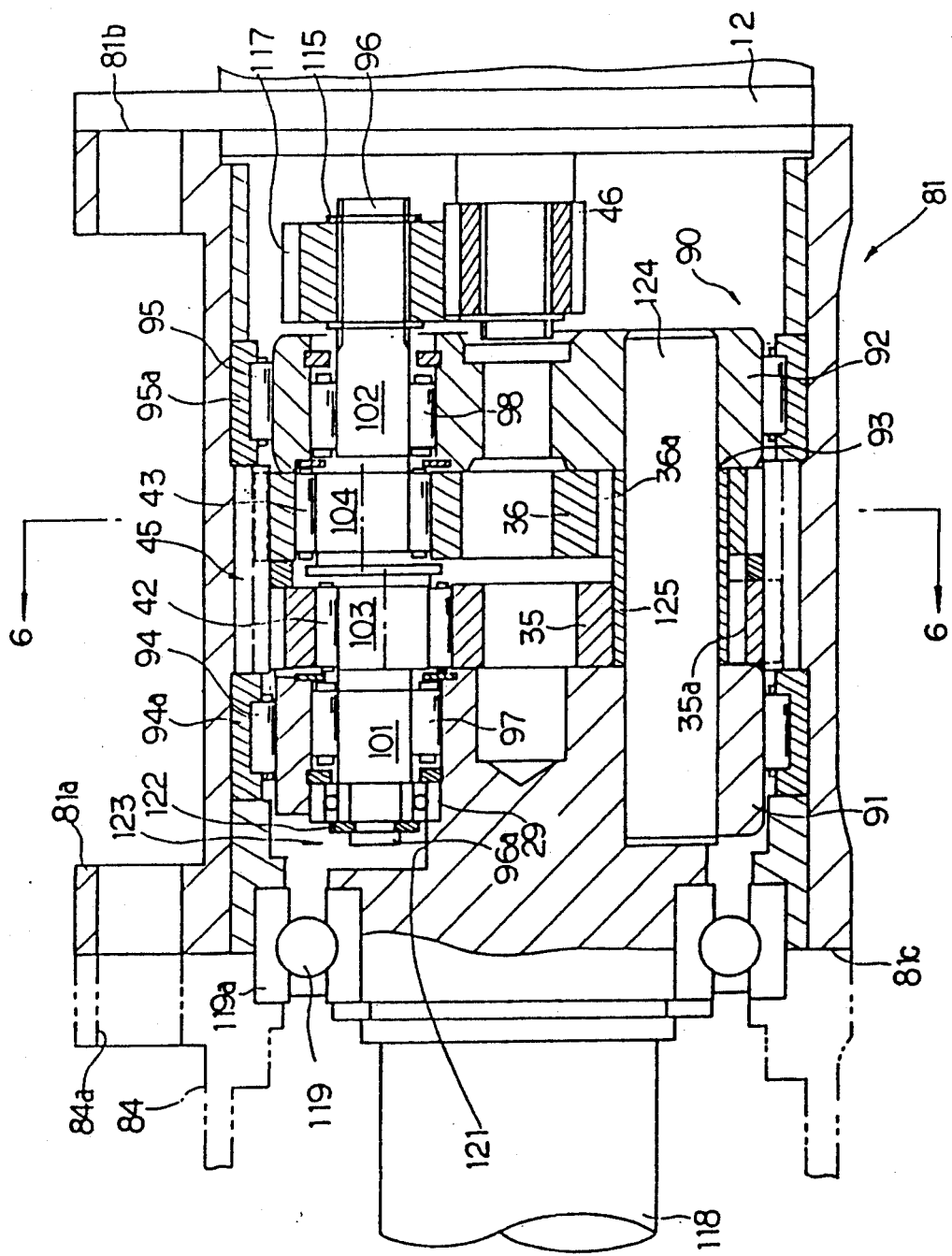
FIG. 5 is a longitudinal cross-sectional view showing a third embodiment of the screw fastening device according to the present invention.
Figure 6:
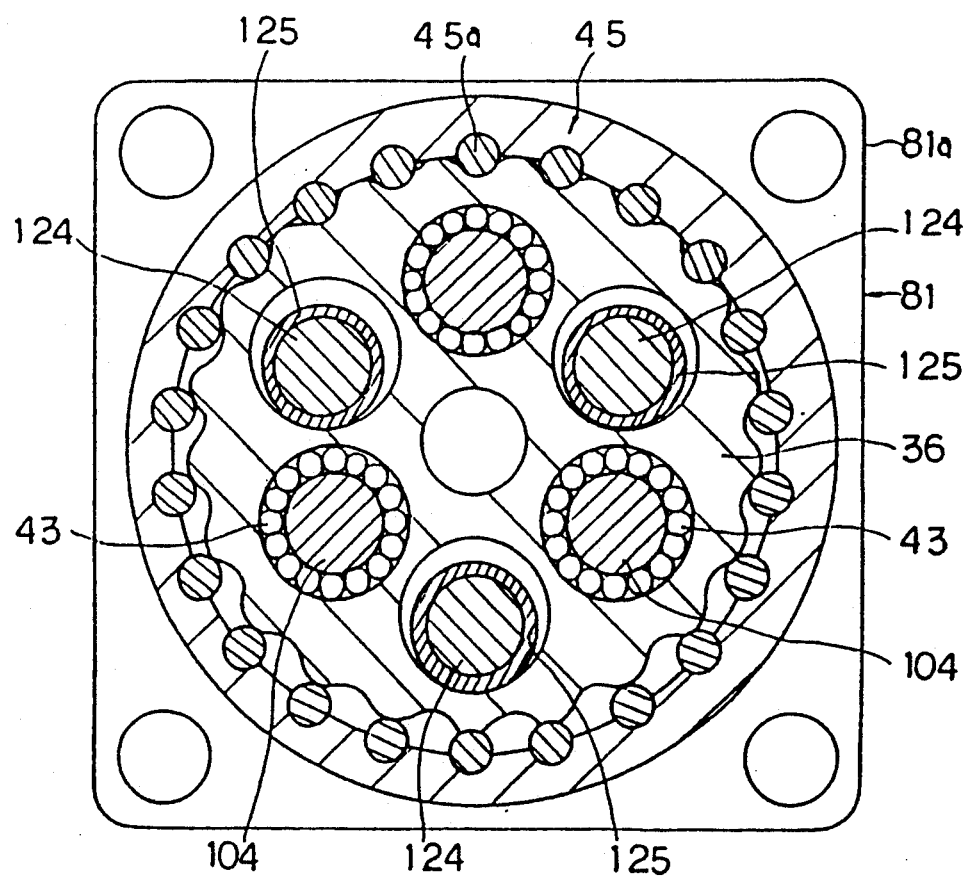
FIG. 6 is a cross-sectional view taken on line 6—6 of FIG. 5.

FIGS. 5 and 6 illustrate a third embodiment of the screw fastening device according to the present invention. Many of the parts of the embodiment of FIGS. 5 and 6 are identical to corresponding parts of the embodiment of FIGS. 1 and 2 and the same reference characters will be applied to the corresponding parts.

In FIGS. 5 and 6, reference numeral 81 denotes a main body casing, which is formed at its opposite ends with flange portions 81a and 81b. The flange portion 81b is fixed to the flange portion of an electric motor 12 by means of a bolt (not shown). A support casing 84 provided in the fore side of the main body casing 81 is identical in operation to the support casing 14 of FIG. 1 and fixed to the main body casing 81 through a bolt bore portion 84a. A block member 90 provided within the main body casing 81 comprises a pair of axially spaced plate portions 91 and 92, a reinforcement member 124, and a sleeve 125 provided between the plate portions 91 and 92. The reinforcement member 124 is inserted into a bore formed in axially inner plate portion 92, sleeve 125 and into a bore formed in the axially outer plate portion 91 so that the plate portions 91 and 92 are connected in parallel and assembled as a unit member. Note that the reinforcement member 124 is press fitted into at least one of the plate portions 91 and 92. In this embodiment, the reinforcement member 124 is press fitted into both of the plate portions 91 and 92.

The block body 90 is freely rotatably supported at the outer peripheries of the plate portions 91 and 92 on the main body casing 81 through needle roller bearings 94 and 95 with outer rings 94a and 95a. The plate portions 91 and 92 are treated by carburizing so that the entire surface portions (including inner surfaces on which needle roller bearings 97 and 98 to be described later are mounted) are hardened. As a result, it is not necessary to provide inner rings. Three torque transmitting pins (input eccentric shaft) 96 are rotatably supported at their opposite ends on the block body 90 through needle roller bearings 97 and 98. Since these bearings 97 and 98 do not require inner and outer rings, the block body 90 can be made smaller. As in the case of the embodiment described above, each torque transmitting pin 96 has axial portions 101 and 102 and eccentric cam portions 103 and 104 provided between the axial portions 101 and 102. Each torque transmitting pin 96 is rotatably supported at its axially innermost end portion 96a on a deep groove ball bearing 29 provided in a bearing chamber 121 formed in the axially inner plate 91. A stop ring 122 is mounted in the axially innermost end portion 96a of the torque transmitting pin 96 for preventing the pin 96 from escaping from the bearing 29. The stop ring 122 is inserted into the chamber 121 through a cutout 123 formed in the plate portion 91 and open to the chamber 121, and is mounted in the end portion 96a of the torque transmitting pin 96. The above described deep groove ball bearing 29 is provided for the purpose of undergoing thrust load only.

Between the main body casing 81 and a rotational output shaft 118 connected to the block body 90, there is provided a deep groove ball bearing 119 which has its inner ring received in a groove formed by the rotational output shaft 118 and the block body 90 so that the inner ring undergoes thrust load only. The outer ring 119a of the bearing 119 axially protrudes from the end face 81a of the main body casing 81. The protruded portion of this outer ring 119a constitutes a mounting portion on which the support casing 84 is mounted. Since the outer ring 119a, which has an outer diameter of high accuracy, is used for mounting the support casing 84, the main body casing 81 and the support casing 84 can be made structurally simple and reduced in diameter. The bearing 29 is loosely fitted in with respect to the torque transmitting pin 96 and the plate portion 91 so that the installation position of the bearing 29 can be determined by the engagement of the torque transmitting pin 96 with the plate portions 91 and 92. A gear 117 meshing with a gear 46 is spline connected to the axially outer end of the torque transmitting pin 96, and the axial movement of the gear 117 is regulated by means of a pair of stop annular rings 115. The rotation from the electric motor 12 is inputted to the torque transmitting pin 96 through the gears 46 and 117.

In the embodiment of FIGS. 5 and 6, externally toothed gears 35 and 36 engage with the torque transmitting pins 96 each rotatably supported at its opposite ends on the block body 90. By rotations of the torque transmitting pins 96, the externally toothed gears 35 and 36 make eccentric motions, respectively, and are rotated according to a difference in number of teeth between the externally toothed gear (35 or 36) and an internally toothed gear 45. Then, the block body 90 and the rotational output shaft 118 are rotated. Therefore, the same effect as that of the embodiment described above can be obtained. In addition, since in the embodiment of FIGS. 5 and 6 the needle roller bearings 94 and 95 of small diameter and held in line contact with the block body 90 undergo radial load exerted on the block body 90 through the torque transmitting pins 96, the main body casing 81 can be reduced in outer diameter. Also, since the entire surface portions of the plate portions 91 and 92 of the block body 90 are hardened by carburizing, the inner rings for the needle roller bearings 94 and 95 are not needed and the inner and outer rings for the bearings 97 and 98 are not needed. Therefore, in addition to the effect of reducing the outer diameter, the screw fastening device according to the present invention can be reduced in size and in weight. Also, after the innermost end portion 96a of the torque transmitting pin 96 has been inserted into the ball bearing 29 provided in the chamber 121, the stop annular ring 122 can be mounted in the end portions 96a through the cutout 123. Therefore, the attachment of the ball bearing 29 to the block body 90 and the process for preventing the escape of the torque transmitting pin 96 become easy. Also, since the plate portions 91 and 92 of the block body 90 are assembled as a unit member by the reinforcement member 124 and therefore screw working to the block body is not needed, the block body 90 can be made smaller. Also, since the support member 84 is connected to the main body casing 81 through the outer ring 119a of the ball bearing 119, it is not necessary to form an engagement portion of the support member 84 with the casing 81. It is only necessary to provide in the casings 81 and 84 a groove in which the outer ring 119a is to received.

Figure 7:
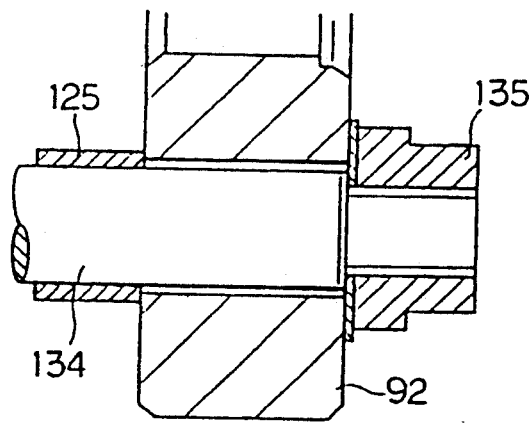
FIG. 7 is a part sectional view showing an alternative of the reinforcement member of FIG. 5.

Although it has been described that the reinforcement member 124 is press fitted into the plate portions 91 and 92 of the block body 90, a reinforcement member 134 can be used, as shown in FIG. 7. That is, the reinforcement member 134 is press fitted into the plate portion 91 and loosely inserted through the plate portion 92. Then, the plate portion 92 is fixed by a sleeve 125 provided between the plates 91 and 92 and by a nut 135 screwed on the outer end of the reinforcement member 134.

The invention has been described with reference to the preferred embodiments. Obviously modifications and alternations will occur to others upon a reading and understanding of this application. It is intended to include all such modifications and alternations insofar as they come within the scope of the appended claims.

What I claim is:

1. A screw fastening device comprising:
   a casing;
   a motor connected to said casing;
   a block body rotatably housed in said casing and having a pair of axially spaced plate portions;
   a first set of needle roller bearings provided between one plate portion of said block body and said casing and a second set of needle roller bearings provided between the other plate portion of said block body and said casing;
   a plurality of torque transmitting pins each rotatably supported on said plate portions of said block body, said pins having eccentric cam portions, respectively, and being rotated by said motor;
   externally toothed gear means formed with engagement portions engaged by said eccentric cam portions of said torque transmitting pins;
   an internally toothed gear fixedly mounted in an inner periphery of said casing so that it can engage with said externally toothed gear means, the internally toothed gear being slightly different in number of teeth from said externally toothed gear means;
   said externally toothed gear means being given an eccentric motion and being rotated by the rotations of said torque transmitting pins;
   said block body being rotated by the rotation of said externally toothed gear means through said torque transmitting pins; and
   a rotational output shaft connected to either one of said plate portions of said block body for fastening screws.

2. A screw fastening device as set forth in claim 1, wherein said externally toothed gear means comprises a plurality of externally toothed gears.

3. A screw fastening device as set forth in claim 1, wherein said block body further has support portions between said plate portions and wherein said plate portions and said support portions are assembled as a unit member by a plurality of bolts.

4. A screw fastening device comprising:
   a casing;
   a motor connected to said casing;
   a block body rotatably housed in said casing and having a pair of upper and lower plate portions;
   a first set of needle roller bearings provided between said upper plate portion of said block body and said casing;
   a plurality of torque transmitting pins each rotatably supported on said plate portions of said block body, said pins having eccentric cam portions, respectively, and being rotated by said motor;
   externally toothed gear means formed with engagement portions engaged by said eccentric cam portions of said torque transmitting pins;
   an internally toothed gear fixedly mounted in an inner periphery of said casing so that it can engage with said externally toothed gear means, the internally toothed gear being slightly different in number of teeth from said externally toothed gear means;
   said externally toothed gear means being given an eccentric motion and being rotated by the rotations of said torque transmitting pins;
   said block body being rotated by the rotation of said externally toothed gear means through said torque transmitting pins;
   a rotational output shaft connected to said lower plate portion of said block body for fastening screws; and
   a mounting bearing undergoing thrust load only that is provided between said rotational output shaft and said casing.

5. A screw fastening device as set forth in claim 4, which further comprises a second set of needle roller bearings which are provided between said lower plate portion of said block body and said casing and undergo radial load.

6. A screw fastening device as set forth in claim 4, wherein each of said torque transmitting pins is rotatably supported at its one end portion on a bearing provided in a bearing chamber formed in said lower plate portion of said block body and wherein a stop ring is inserted into said chamber through a cutout formed in said lower plate portion and open to said chamber and is mounted in said one end portion of said torque transmitting pin.

7. A screw fastening device as set forth in claim 4, wherein said upper and lower plate portions of said block body are assembled as a unit member by a reinforcement member press fitted in bores formed respectively in said plate portions.

8. A screw fastening device as set forth in claim 4, wherein said plate portions of said block body are treated by carburizing, and said plurality of torque transmitting pins are each rotatably supported on the carburized plate portions through bearings without inner and outer rings.

9. A screw fastening device as set forth in claim 4, wherein an outer ring of said mounting bearing protrudes from an end face of said casing, and the protruded portion of said outer ring constitutes a mounting portion for the mounting of other members.

10. A screw fastening device comprising:
    a casing;
    a motor connected to said casing and having an output shaft;
    a block body rotatably housed in said casing and having a pair of axially spaced plate portions;
    a first set of needle roller bearings provided between one plate portion of said block body and said casing and a second set of needle roller bearings provided between the other plate portion of said block body and said casing;
    a center crankshaft rotatably supported at a central portion of said block body and connected at one end to said output shaft of said motor and having an eccentric cam portion;
    a plurality of torque transmitting pins each rotatably supported on said plate portions of said block body, said pins having eccentric cam portions, respectively;
    externally toothed gear means formed with engagement portions engaged by said eccentric cam portions of said torque transmitting pins and also formed with a central cutout portion engaged by said eccentric cam portion of said center crankshaft;
    an internally toothed gear fixedly mounted in an inner periphery of said casing so that it can engage with said externally toothed gear means, the internally toothed gear being slightly different in number of teeth from said externally toothed gear means;

said externally toothed gear means being given an eccentric motion and being rotated by rotation of said center crankshaft;

said block body being rotated by the rotation of said externally toothed gear means through said torque transmitting pins; and a rotational output shaft connected to either one of said plate portions of said block body for fastening screws.

* * * * *